United States Patent [19]

Koshkin et al.

[11] 4,268,243

[45] May 19, 1981

[54] MACHINE FOR MOULDING ARTICLES FROM THERMOPLASTIC POLYMERIC MATERIALS

[76] Inventors: Lev N. Koshkin, 3 Samotechny pereulok, 23, kv. 54, Moscow; Valery M. Semenov, ulitsa Fevralskaya, 11, kv. 11, Klimovsk Moskovskoi oblasti; Jury A. Repin, ulitsa Simferopolskaya, 19, kv. 59, Klimovsk Moskovskoi oblasti; Anatoly M. Pozdnyakov, ulitsa Simferopolskaya, 19, kv. 71, Klimovsk Moskovskoi oblasti; Nikolai Z. Lutskov, p/o Znamya Oktyabrya, 5, kv. 12, Podolsk Moskovskoi oblasti, all of U.S.S.R.

[21] Appl. No.: 60,721

[22] Filed: Jul. 25, 1979

Related U.S. Application Data

[63] Continuation of Ser. No. 859,098, Dec. 9, 1977.

[51] Int. Cl.³ .............................................. B29F 1/00
[52] U.S. Cl. ..................................... 425/575; 425/451
[58] Field of Search .............. 425/451, 453, 454, 556, 425/574, 575, 576; 198/484, 606

[56] References Cited

U.S. PATENT DOCUMENTS

| 3,121,919 | 2/1964 | Turner | 425/556 |
|---|---|---|---|
| 3,412,432 | 11/1968 | Fuglsang-Madgen | 425/575 |
| 3,601,954 | 8/1971 | Aronson | 198/484 X |
| 3,840,316 | 10/1974 | Poeschl | 425/451 X |
| 3,866,737 | 2/1975 | Simon | 198/484 X |
| 3,993,787 | 11/1976 | Nakabayashi | 425/575 X |

FOREIGN PATENT DOCUMENTS

| 900748 | 1/1954 | Fed. Rep. of Germany | 425/562 |
|---|---|---|---|
| 1541603 | 10/1967 | France | |
| 318482 | 12/1969 | U.S.S.R. | 425/575 |

*Primary Examiner*—Thomas P. Pavelko
*Attorney, Agent, or Firm*—Robert E. Burns; Emmanuel J. Lobato; Bruce L. Adams

[57] ABSTRACT

A machine comprises a plastication arrangement communicating, via passages, with a rotor having injection cylinders on the periphery thereof for feeding therefrom melt into moulds which are arranged in a closed conveyor extending around the rotor. Parts of the moulds having gate passages are arranged in another conveyor which also extends around the rotor and a rotor removing gates from the gate passages. The machine also comprises a rotor for removing finished articles which co-operates with the conveyor carrying the moulds.

The conveyors move synchronously and, as they move together around the rotor having the injection cylinders, the injection cylinders are coupled to the moulds, and melt is injected into the moulds. After the conveyors leave the rotor in which melt is injected, they move along different paths to co-operate with the rotors removing gates from the gate passages and finished articles from the moulds.

3 Claims, 8 Drawing Figures

MACHINE FOR MOULDING ARTICLES FROM THERMOPLASTIC POLYMERIC MATERIALS

This is a continuation, of application Ser. No. 859,098, filed Dec. 9, 1977.

BACKGROUND OF THE INVENTION

The invention relates to the equipment for processing of polymers, and more specifically to injection moulding machines for moulding articles from thermoplastic polymeric materials.

The invention may be most efficiently used for moulding articles of up to 40 $m^3$ in volume, such as glass container lids, electric plugs, sealing members and the like.

Known in the art is a machine for moulding articles of thermoplastic polymeric materials (cf. French Pat. Nos. 1541603, B 29, 1968). The machine comprises a plastication arrangement, an injection cylinder communicating with the plastication arrangement, moulds spaced along the periphery of a rotor and means for removing gates and articles from the moulds. Means for removing gates from the moulds comprises a harpoon having catches in the form of helical or annular grooves, indents, recesses and the like and provided with a reciprocatory drive.

In operation, the injection cylinder is transferred to the gate passage of the mould and injects melt into the cavity of the mould. After a short-time delay, the injection cylinder is retracted from the mould, the rotor is caused to rotate through a pre-set angle, and the above-described operation is repeated for the next mould. During subsequent rotations of the rotor, the moulds are cooled, gates are removed from the gate passages, the moulds are then opened (that is male dies are spaced apart from the female dies), and the articles are removed from the moulds.

The main disadvantage of this machine resides in inadequate reliability of removal of gates from the gate passages. During the removal of a gate, the harpoon penetrates it and, during the return stroke, withdraws the gate from the gate passage of the mould. This method of removing gates is only applicable to the processing of low-hardness materials such as polyethylene. The machine cannot be employed for processing harder materials, such as polycarbonates, polyamides, polyformaldehydes due to a short life of the harpoons.

Furthermore, even in processing materials of low hardness, the above-described method of removing gates restricts the productivity of the machine since with an increased productivity, the time for gate removal operation becomes shorter, and failures to remove a gate from the gate passage are more likely to occur thus resulting in increased amount of rejects and substantial lowering of the use factor of the machine.

Known in the art is another machine for moulding articles from thermoplastic polymeric materials. This machine comprises a plastication arrangement, injection cylinders communicating with the plastication arrangement and arranged along the periphery of a rotor which is embraced by a closed conveyor carrying moulds for feeding melts thereinto from the injection cylinders, means for removing gates from gate passages and means for removing articles from the moulds.

In this machine, means for removing gates from the gate passages of the moulds comprises a rotor having harpoons spaced along the periphery thereof and actuated by a cylindrical cam.

Means for removing articles from the moulds comprises a rotor having mechanisms for opening the moulds and removing articles therefrom, which are spaced along the rotor periphery.

In operation, polymeric material flows through the plastication arrangement and heated passages of the rotor to get into the injection cylinders. The melt is injected from the injection cylinders, through the gate passages of the moulds, into the mould cavities, and the moulds are then successively transferred by the closed conveyor through means for removing gates and means for removing articles which also comprise rotors.

Gates are removed in this machine also by means of harpoons in the manner similar to that described above, the operating conditions being, however, substantially better. Operating time for gate removal may be selected to be an optimum one for any productivity of the machine by making a desired number of rotor stations for gate removal. This machine cannot, however, be used for processing high-hardness materials also in view of short life of harpoons.

SUMMARY OF THE INVENTION

It is an object of the invention to improve reliability of a machine for moulding articles from thermoplastic polymeric materials.

Another object of the invention is to enlarge the field of application of a machine for moulding articles from thermoplastic polymeric materials.

Still another object of the invention is to improve the productivity of a machine for moulding articles from thermoplastic polymeric materials.

These and other objects and advantages of the invention are achieved by that in a machine for moulding articles from thermoplastic polymeric materials comprising a rotor co-operating with a closed conveyor carrying moulds to which melt is fed through gate passages from injection cylinders which are successively filled on the periphery of the rotor from a plastication arrangement, a rotor for removing articles from the moulds co-operating with said conveyor and a rotor for removing gates from the gate passages, wherein, according to the invention, each mould is made composite of at least two parts, an article being moulded in one part and one of said gate passages being arranged in the other part, all parts of the moulds having the gate passages being arranged in an auxiliary closed conveyor which co-operates with the rotor for removing gates from the gate passages and with the rotor in which melt is injected into the moulds and which moves on this rotor in the direction coinciding with the direction of movement of the conveyor carrying the moulds.

The provision of the auxiliary closed conveyor which carries the parts of the moulds having the gate passages permits these parts of the moulds to be transferred along a path other than that of the conveyor carrying the remaining parts of the moulds. This, in turn, enables more efficient removal of gates from the gate passages and allows articles to be made from harder materials. In addition, this construction of the machine, due to more reliable removal of gates from the gate passages results in increased productivity of the machine.

The auxiliary closed conveyor preferably comprises a closed chain conveyor having its links incorporating the parts of the moulds having the gate passages, one end of each part being attached by means of a pin to a pivot of the chain, and the other end having a hole receiving a second pin secured to the link to ensure the alignment of axes of the gate passages with axes of the injection cylinders during injection of melt into the moulds.

In accordance with one embodiment of the invention, each link of the auxiliary closed conveyor comprises a yoke embracing one of the injection cylinders. This construction of the conveyor links enables a substantial reduction of the length of gates passages thus contributing to savings of material consumed for moulding articles and improving the conditions for injection of melt into the moulds (the resistance offered to the melt flowing to the moulds is lowered).

In accordance with another embodiment of the invention, there is provided an additional rotor arranged in the path of movement of both conveyors, which has catches engaging the parts of the moulds having the gate passages to separate these parts of the moulds from the moulds.

The provision of the additional rotor enables substantial reduction of loads imposed on the conveyor elements during separation of the conveyors at the portions of their movement along different paths. This construction of the machine prolongs its service life.

BRIEF DESCRIPTION OF THE DRAWINGS

Other objects and advantages of the invention will become apparent from the following detailed description of an embodiment thereof illustrated in the accompanying drawings, in which.

DESCRIPTION OF THE PREFERRED EMBODIMENTS

Figure 1:
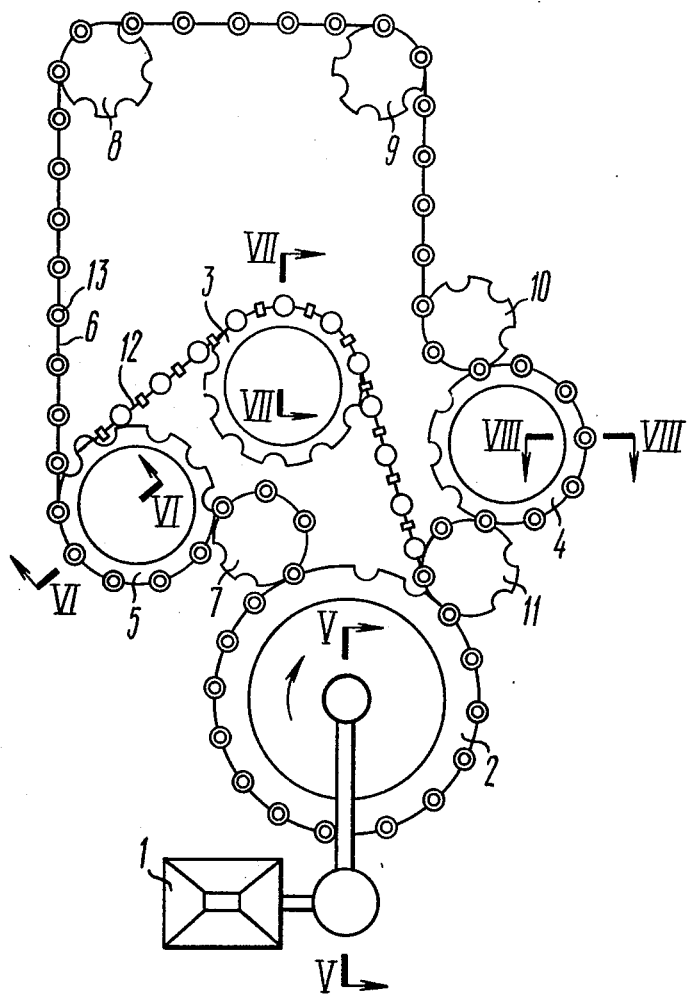
FIG. 1 is a diagrammatic view of the machine according to the invention.

The machine according to the invention comprises a plastication arrangement 1 (FIG. 1) communicating, via heated passages, with a rotor 2, as well as rotors 3, 4, 5. A closed chain conveyor 6 passes around the rotors 2, 4, 5 and through tensioning sprockets 7, 8, 9, 10, 11. A second closed chain conveyor 12 passes around the rotors 2, 3, 5 and through tensioning sprockets 7, 11.

Figure 3:
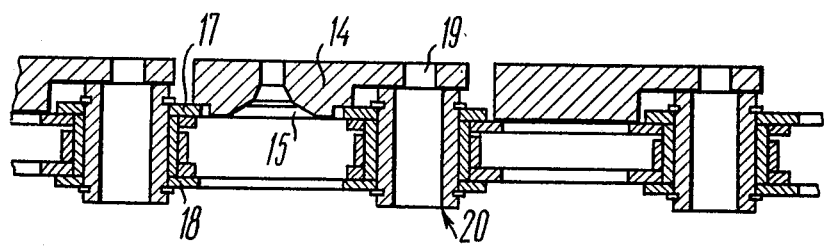
FIG. 3 is a sectional view taken along the line III—III in FIG. 2.
Figure 2:
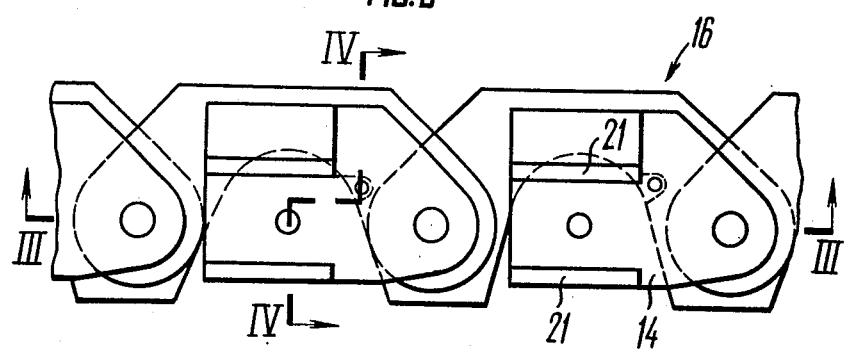
FIG. 2 is a plan view of the portion of the conveyor carrying plates having gates passages.

Pivots of the conveyor 6 incorporate moulds 13, the parts of the moulds 13—plates 14—in which there are provided tapered gate passages 15, are attached to the conveyor 12 (FIGS. 2, 3). The number of the plates 14 is considerably smaller than that of the moulds 13, but in certain applications it may correspond to the number of the moulds 13.

The conveyor 12 comprising a link chain (FIGS. 2, 3) has articulated links 16, each link having an upper plate 17 and a lower plate 18 formed as yokes. Each plate 14 having a tapered gate passage 15 is attached by means of a pin 19 to one of pivots 20 of the chain for vertical displacement and limited rotation about the axis of the pin 19. The gate passage 15 extends over the recesses of the yoke plates 17, 18, and the upper plate 17 supports the plate 14. In addition, the plate 14 has tapers 21.

Figure 4:
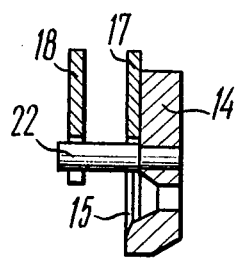
FIG. 4 is a sectional view taken along the line IV—IV in FIG. 3.

To limit rotation of the plate 14 (FIG. 4) about the axis of the pin 19, the plate 14 is provided with a stop pin 22 received in through holes of the upper plate 17 and lower plate 18, the diameter of the holes being greater than the diameter of the stop pin 22 by the amount of a play required for obtaining the alignment of the passage 15 of the plate 14 and of the mould 13.

Figure 5:
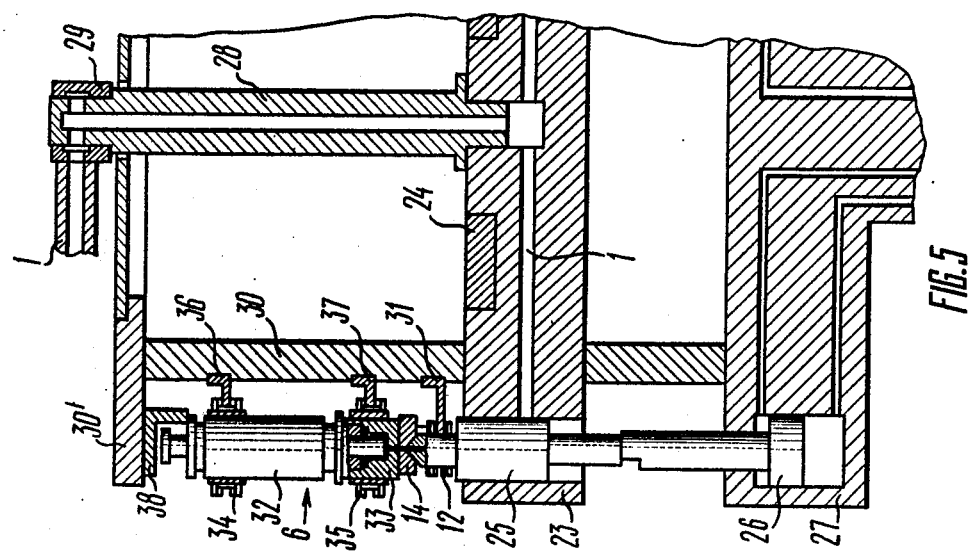
FIG. 5 is a sectional view taken along the line V—V in FIG. 1.

The rotor 2, in which melt is injected into the moulds 13 (FIG. 5), comprises a drum 23 having heating elements 24, and injection cylinders 25 spaced along the periphery thereof for displacement axially along the rotor, 2 which are coupled to hydraulic actuating cylinders 26 spaced along the periphery of another drum 27 rigidly secured to the drum 23. The hydraulic actuating cylinders 26 are controlld by means of a hydraulic distribution arrangement (not shown). Each injection cylinder 25 is provided, at the outlet, with a shut-off means (not shown) and is connected by means of passages of the drum 23, a hollow shaft 28 and a manifold arrangement 29 to the plastication arrangement 1 which may be of any appropriate known design. The drum 23 is connected, by means of a sleeve 30, to an upper bearing disc 30'. A sprocket 31 is secured to the sleeve 30 and engages the conveyor 12 carrying the plates 14.

The moulds 13 arranged in the conveyor 6 may be of any appropriate known design generally used in rotary conveyor type injection moulding machines, but most preferable are the moulds in which male dies 32 are arranged in one conveyor chain and female dies 33 are arranged in the other conveyor chain, the male die 32 being coupled to the female die 33 at regular intervals to define a shot space. Chains 34 and 35 of the conveyor 6 engage sprockets 36 and 37, respectively, mounted on the sleeve 30. The bearing disc 30' has a bearing bar 38 against which the male dies 32 bear during injection of melt into the moulds 13. The sprockets 36 and 37 are staggered relative to each other so that the pivots of the conveyor 6 are shifted relative to the pivots 20 of the conveyor 20 at a distance equal to one half of the spacing of the conveyors 6, 12.

Figure 6:
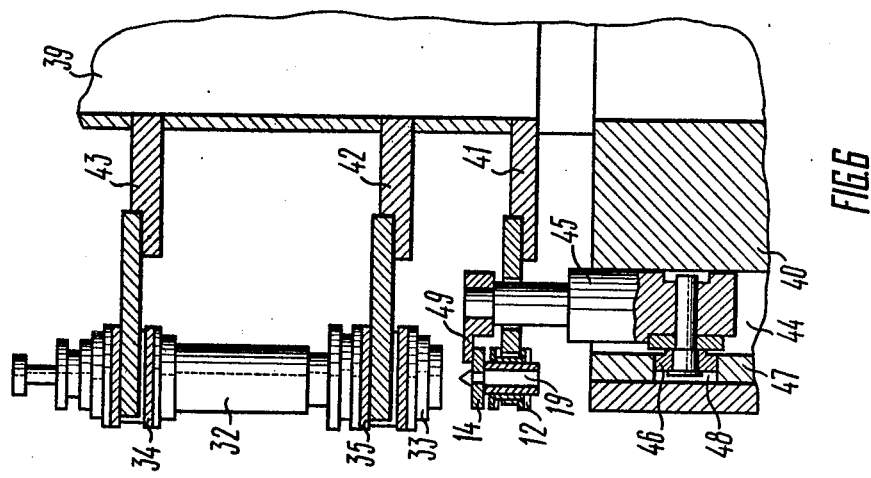
FIG. 6 is a sectional view taken along the line VI—VI in FIG. 1.

The rotor 5 is designed for separating the plates 14 from the moulds 13 (FIG. 6) and comprises a shaft 39 supporting a drum 40 and sprockets 41, 42 and 43 rigidly secured thereto. The sprocket 41 engages the conveyor 12, and the sprockets 42 and 43 engage the links of the chains 34 and 35 of the conveyor 6. Through holes 44 are made along the periphery of the drum 40 to receive vertical sliders 45 having rollers 46. A fixed cylindrical cam 47 having a camming groove 48 receiving the rollers 46 of the sliders 45 is mounted concentrically with the drum 40. Each slider 45 has a projection 49 which is engageable with a respective plate 14 in the zone of movement of the conveyors 6 and 12 around the rotor 5.

Figure 7:
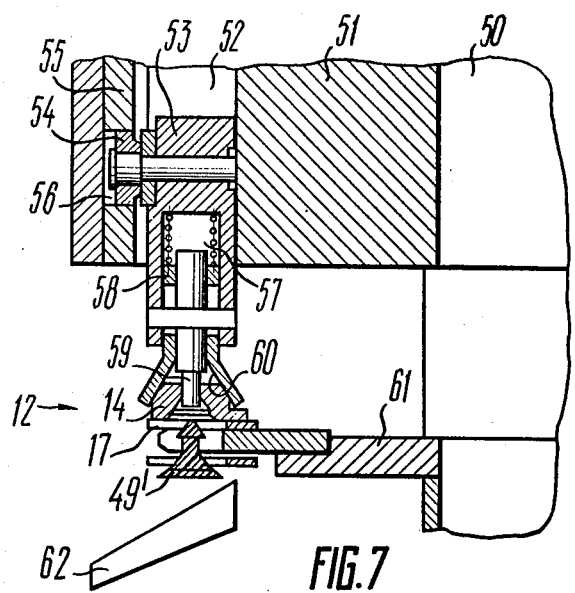
FIG. 7 is a sectional view taken along the line VII—VII in FIG. 1.

The rotor 3 is designed to remove the gates 49' (FIG. 7) from the gate passages and comprises a shaft 50 supporting a drum 51 rigidly secured thereto having through holes 52 spaced along the periphery thereof to receive sliders 53 having rollers 54. A fixed cylindrical cam 55 having a groove 56 receiving the rollers 54 of the sliders 53 is mounted concentrically with the drum 51. Each slider 53 has a cavity 57 in the lower part thereof receiving an ejector of gates 49' comprising a spring-loaded bushing 58 having a central bore accommodating a rod 59. The lower part of the bushing 58 is internally provided with a tapered guide surface 60 which is congruent to the taper 21 of the plate 14.

A sprocket 61 is rigidly secured to the shaft 50 below the drum 51 and engages the conveyor 12 in such a manner that, in the zone of movement of the conveyor 12 around the rotor 3, each rod 59 of the ejector is located over the respective plate 14 coaxially with its tapered gate passage 15. A collector 62 for gates 49' is arranged in this zone of the rotor 3.

Figure 8:
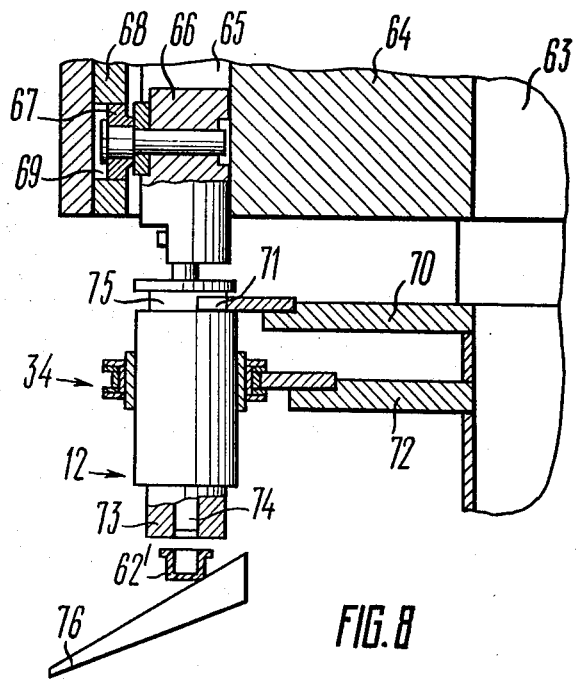
FIG. 8 is a sectional view taken along the line VIII—VIII in FIG. 1.

The rotor 4 is designed for removing articles 62' (FIG. 8) from the moulds 13 and comprises a shaft 63 supporting a drum 64 rigidly secured thereto having through holes 65 spaced along the periphery thereof receiving sliders 66 having rollers 67. A fixed cylindrical cam 68 having a camming groove 69 receiving the rollers 67 of the sliders 66 is mounted concentrically with the drum 64. A bearing disc 70 having profiled recesses 71 and a sprocket 72 engaging the chain 34 of the male dies 32 of the conveyor are rigidly secured to the shaft 63 below the drum 64. Each male die 32 consists of a body 73 in which there is provided a vertically movable rod 74. In the zone of movement of the conveyor 6 around the rotor 4, each rod 74 is coupled to the respective slider 66 by means of a bayonet coupling (not shown). Each body 73 of the male die 32 has a groove 75. A tray 76 for collecting the finished articles 62' is mounted in the zone of movement of the conveyor 6 around the rotor 4, below the male dies 32.

The sprocket 10 mounted before the rotor 4 has mechanisms for lifting the male dies 32 (not shown) having a drive for their reciprocation.

In operation, the machine is driven by an electric motor and a transmission system which consists of gear transmissions (not shown) ensuring synchronous rotation of the conveyors 6 and 12 and rotors 2, 3, 4 and 5.

The machine functions in the following manner. When the machine is turned on, the rotors 2, 3, 4, 5 and the conveyors 6 and 12 (FIG. 1) are caused to rotate synchronously (FIG. 1). The plastication arrangement 1 (FIG. 5) pumps melt through the manifold arrangement 29, hollow shaft 28 and passages 1' of the drum 23 to the injection cylinders 25 of the rotor 2.

When moving around the rotor 2 in the conveyor 6, the moulds 13 are put together: the male dies 32 are coupled to the female dies 33 so as to define an shot space there between. As the rotor 2 rotates, in the zone of combined movement of the conveyors 6 and 12 therearound, the injection cylinders 25 are caused to move upwards by the hydraulic cylinders 26 so that the heads of the injection cylinders 25 are received in the recesses of the plates 17 and 18 and enter the gate passages 15 of the plates 14 which are attached to the conveyor 12. As the plate 14 is mounted for limited rotation about the axis of the pin 19, the gate passage 15 is aligned with the inlet opening of the mould 13 under the action of the head of the injection cylinder 25. Due to continuing movement of the injection cylinders 25, the plates 14 are caused to move upwards, and the pin 19 slides in the pivot 20. As the plate 17 bears against the female die 33, the entire mould 13 is slightly raised, and its male die 32 bears against the bearing bar 38. Then the shut-off member of the injection cylinder 25 is opened, and melt is injected into the mould 13. Subsequently the injection cylinders 25 move downwards and, since there is a sufficient friction between the head of the injection cylinder 25 and a part of the gate passage 15 of the plate 14, the plate 14 is separated from the mould 13. The gate 49' remains in the gate passage 15 of the plate 14.

As the rotor 2 (FIG. 1) rotates, the moulds 13 filled with melt, as well as the plates 14 containing gates 49', leave the zone of movement of the conveyors 6 and 12 around the rotor 5, move around the tensioning sprocket 7 and get to the zone of movement of the conveyors 6 and 12 around the rotor 5 which is the zone of separation of the plates 14 from the moulds 13.

The rotor 5 (FIG. 6) is used to separate the plates 14 from the moulds 13. In this rotor 5, the conveyor 12 engages the sprocket 41 in such a manner that the projections 49 of the sliders 45 are slightly above the plates 14. As the rotor 2 rotates, the sliders 45 are lowered by the fixed cylindrical cam 47, their projections 49 engage the plates 14 and cause them to move down to the upper plates 17, and the gate 49' is concurrently stripped away from the mould 13.

As the conveyors 6 and 12 continue to move further (FIG. 1), the moulds 13 filled with melt, as well as the plates 14 containing the gates 49', leave the zone of movement of the conveyors 6 and 12 around the rotor 5, and the paths of movement of the conveyors 6 and 12 diverge in plan. The conveyor 6 carrying the moulds 13 is directed to the rotor 4 via the sprockets 8, 9, 10 for removal of the finished articles 62'. It is noted that the distance from the rotor 5 to the rotor 4 should be great enough for desired cooling of the articles 62' in the moulds 13. If necessary, various known per se cooling devices may be arranged at this portion of the conveyor 6. The conveyor 12 moves around the rotor 3 and is then directed again to the rotor 2.

In the rotor 3 (FIG. 7), the conveyor 12 engages the sprocket 61 in such a manner that the sliders 53 having the ejectors are arranged over a respective plate 14 and in alignment with its tapered gate passage 15. As the rotor 3 is rotated, the sliders 53 are caused to move downwards by the fixed cylindrical cam 55, and the tapered guide surface 60 of the bushing 58 engages the congruent tapers 21 of the gate plate 14 to accurately align it with the rod 59. As the sliders 53 continue to move downwards, the rod 59 ejects the gate 49' from the passage 15 of the plate 14 into the collector 62 of the gates 49'. At this stage, the upper plate 17 of the conveyor 12 supports the plate 14. As the rotor 3 rotates, the sliders 53 are caused to move upwards by the cam 55, the rods 59 leave the passages 15 of the plates 14 which are then directed to the rotor 2.

When the conveyor moves around the tensioning sprocket 10 (FIG. 1), the moulds 13 with the finished articles 62' are opened, that is the male dies 32 are lifted in the pivots of the chain 34 by the mechanisms for lifting the male dies (not shown). Thus, the male dies 32 are caused to move in the rotor 4 by the chain 34 of the conveyor 6 (FIG. 8) in such a manner that the groove 75 of the body 73 of each male die 32 receives the profiled recesses 71 of the bearing disc 70, and the rods 74 are coupled to the sliders 66. As the rotor 4 rotates the sliders 66 are lifted by the fixed cylindrical cam 68 to entrain with them the cavity forming rod 74. At the same time, the articles 62' bear against the bodies 73 of the male dies 32 and are thereby removed from the rod 74 and fall down to the tray 76. The chain 35 of the conveyor 6 carrying the female dies 33 passes below the tray 76 (not shown). Upon emergence of the moulds 13 from the zone of movement of the conveyor 6 around the rotor 4, the rods 74 are disengaged from the sliders 66, and the male dies 32 are lowered under gravity in the pivots of the chain 34 of the conveyor 6 and are again coupled to the female dies 33 to define the moulds 13 which are then transferred by the conveyor 6 to the rotor 2. After the movement around the tensioning sprocket 11, the paths of movement of the conveyors 6 and 12 in plan again coincide, and the cycle of manufacture of articles 62' is repeated.

The provision of the conveyor 12 carrying the plates 14 having the gate passages 15 in the machine according to the invention improves the reliability of removal of the gates 49' from the moulds 13 while concurrently simplifying the construction of the machine as a whole. Improved reliability of removal of the gates 49' from the moulds 13 during continuous operation of the machine has a positive effect on its productivity and use factor.

The above-described construction of the machine may be recommended for high-speed rotary conveyor injection moulding machines with a productivity from 200 to 1000 pieces per minute for making articles of a volume from 1 to 40 cm$^3$.

What is claimed is:

1. A machine for molding articles from thermoplastic polymeric materials comprising a continuously driven endless first conveyor transporting a first plurality of mold halves each having a gate, said continuously driven endless first conveyor transporting a second plurality of other mold halves in synchronism with the first plurality of mold halves for effectively continuously selectively placing individual paired mold halves into registry for forming jointly individual travelling molds for molding individual articles therein, a second driven conveyor having gate-defining means spaced thereon defining gate passages positioned in registry with the individual gates of the molds of said first conveyor selectively for delivery of a melted thermoplastic polymeric material into the individual molds therethrough and means including rotors over which the second conveyor passes to place the gate-defining means in and out of registry with the individual molds during travel of said driven first conveyor and said second conveyor, a rotor driven synchronously with both conveyors and over which both conveyors pass having injection cylinders for injecting said melted thermoplastic polymeric material into the individual molds through the individual gate passages when in registry with said molds, means for delivery of said melted thermoplastic polymers material to said injection cylinders, means for actuating the cylinders individually into positions for alternately receiving the melted thermoplastic polymeric material and for injecting the melted thermoplastic polymeric material into the molds when a corresponding gate-defining means defining a gate passage is in registry with a corresponding mold means comprising a rotor over which the first conveyor passes for opening the molds automatically during travel thereof after removal of the gate-defining means from said molds for removal of the molded articles therein, and the gate-defining means being less in number than the number of molds.

2. A machine for molding articles from thermoplastic polymeric materials according to claim 1, in which said first conveyor comprises a link conveyor having links and individual pivots thereon pivotally mounting said gate-defining means for movement of the gate passages into axial alignment with corresponding injection cylinders, and means limiting said movement to effect said alignment.

3. A machine for molding articles from thermoplastic polymeric materials according to claim 2, in which said means for moving of the gate passages from registry with the corresponding molds is driven synchronously with both conveyors and comprises means for effecting separation of the gate-defining means defining gate passages from said corresponding molds.

* * * * *